(12) United States Patent
Yamamoto

(10) Patent No.: US 8,330,848 B2
(45) Date of Patent: Dec. 11, 2012

(54) IMAGING DEVICE

(75) Inventor: Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 12/769,167

(22) Filed: Apr. 28, 2010

(65) Prior Publication Data

US 2010/0283863 A1 Nov. 11, 2010

(30) Foreign Application Priority Data

May 11, 2009 (JP) ................ P2009-114740

(51) Int. Cl.
*G02B 27/10* (2006.01)
*H04N 5/225* (2006.01)

(52) U.S. Cl. ........................ 348/343; 359/619

(58) Field of Classification Search ............. 348/335, 348/340, 343, 345, 369; 359/619, 626
See application file for complete search history.

(56) References Cited

U.S. PATENT DOCUMENTS 7,745,772 B2 * 6/2010 Utagawa .................. 250/208.1
2010/0026852 A1 * 2/2010 Ng et al. ...................... 348/239

FOREIGN PATENT DOCUMENTS

WO 2006-039486 A2 4/2006

OTHER PUBLICATIONS

Ren. Ng, et al., "Light Field Photography with a Hand-Held Plenoptic Camera", Stanford Tech Report CTSR Feb. 2005.

* cited by examiner

*Primary Examiner* — Daniel M Pasiewicz
(74) *Attorney, Agent, or Firm* — K&L Gates LLP

(57) ABSTRACT

Disclosed herein is an imaging device, including: an imaging lens configured to have an aperture stop; an imaging element configured to include a plurality of pixels that each have a rectangular shape as a planar shape and are arranged in a matrix as a whole, and acquire imaging data based on received light; and a lens array unit configured to be disposed on an image forming plane of the imaging lens and include a plurality of lenses, a respective one of the lenses being assigned to n, n is an integer equal to or larger than 2, pixels arranged along a shorter-side direction of the pixels having the rectangular shape in the imaging element.

4 Claims, 8 Drawing Sheets

FIG.5A
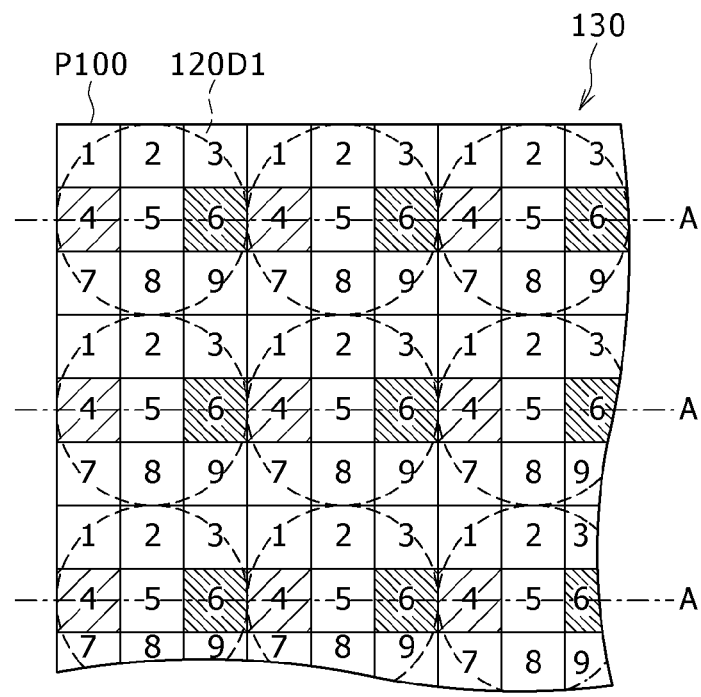
FIG.5B
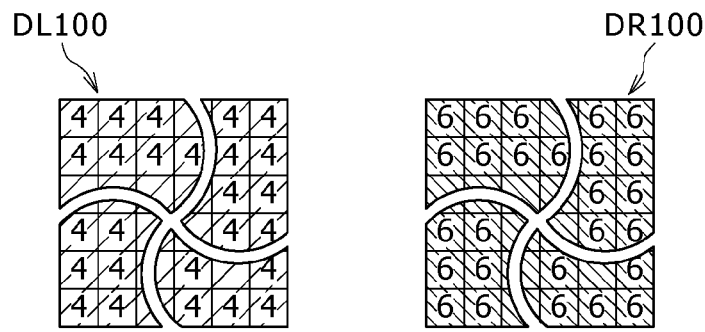
(RESOLUTION B100=Pn/9)　　(B100=Pn/9)

(RESOLUTION B=Pn/3)

IMAGING DEVICE

CROSS REFERENCES TO RELATED APPLICATIONS

The present application claims priority to Japanese Priority Patent Application JP 2009-114740 filed in the Japan Patent Office on May 11, 2009, the entire content of which is hereby incorporated by reference.

BACKGROUND

The present application relates to an imaging device employing a microlens array.

Various imaging devices have been proposed and developed. Furthermore, there have also been proposed imaging devices that execute predetermined image processing for imaging data obtained by imaging and output the resulting data.

For example, PCT Patent Publication No. WO06/039486 brochure and Ren. Ng and other seven co-authors, "Light Field Photography with a Hand-Held Plenoptic Camera," Stanford Tech Report CTSR 2005-02 propose an imaging device employing a technique called "light field photography." This imaging device includes an imaging lens having an aperture stop, a microlens array, an imaging element, and an image processor. Such a configuration allows the imaging element to obtain imaging data including not only the intensity distribution of light but also information on the traveling directions of the light. Furthermore, an observation image from arbitrary viewpoint and direction (hereinafter, referred to simply as the viewing field) can be reconstructed in the image processor.

SUMMARY

Plural microlenses are provided in the above-described microlens array, and plural pixels of the imaging element are assigned to each of the microlenses. In the case of using the above-described technique, the number of pixels of the reconstructed image is equal to the number of microlenses in the microlens array. This is because the information on the two-dimensional coordinates of the reconstructed image depends on the coordinates of the microlens array. Therefore, the number of pixels of the reconstructed image is equal to the value obtained by dividing the number of all pixels of the imaging element by the number of pixels assigned to each microlens (hereinafter, referred to as the lens-assignment pixels). On the other hand, the number of lens-assignment pixels is equal to the resolution of the angular information of the light ray and determines the resolution of an arbitrary viewing field of the reconstructed image, i.e. how many viewpoints and directions from which observation images can be reconstructed. Thus, the resolution of the arbitrary viewing field and the number of pixels of the two-dimensional coordinates are in a trade-off relationship.

Here, a consideration will be made below about the case of acquiring plural viewpoint images (multi-viewpoint images) whose viewpoints are different from each other in one of the horizontal direction (lateral direction) and the vertical direction (longitudinal direction). In general, the longitudinal and lateral pitches of the respective microlenses are identical to each other, and the planar shape of each pixel of the imaging element is a square. Therefore, two-dimensionally arranged pixels such as 3×3 pixels or 2×2 pixels are assigned to each microlens. In the case of acquiring the above-described multi-viewpoint images in one direction with such a configuration, the respective viewpoint images are generated by using only the pixel data of the pixels aligned on one line among the lens-assignment pixels. For example, when the number of lens-assignment pixels is 3×3, the number of pixels aligned on one line is 3. Therefore, two or three viewpoint images are generated by using these pixels.

However, the number of pixels of the two-dimensional coordinates of each viewpoint image is equal to the value obtained by dividing the number of all pixels of the imaging element by the number of lens-assignment pixels as described above. Thus, in the case of acquiring multi-viewpoint images in only one direction, although the pixels other than those on one line among the lens-assignment pixels are substantially unnecessary, the number of pixels, i.e. the two-dimensional resolution, of the viewpoint images obtained finally is decreased due to the existence of these unnecessary pixels.

The present application provides an imaging device capable of enhancing the two-dimensional resolution of each of multi-viewpoint images in the case of generating the multi-viewpoint images in only one direction based on imaging data that is so acquired as to include information on the traveling directions of the light according to an embodiment.

According to an embodiment, there is provided an imaging device including an imaging lens configured to have an aperture stop, an imaging element configured to include a plurality of pixels that each have a rectangular shape as a planar shape and are arranged in a matrix as a whole, and acquire imaging data based on received light, and a lens array unit configured to be disposed on the image forming plane of the imaging lens and include a plurality of lenses. A respective one of the lenses is assigned to at least two pixels arranged along the shorter-side direction of the pixels having the rectangular shape in the imaging element.

In an imaging device according to an embodiment, the image of an imaging object by the imaging lens is formed on the lens array unit. Furthermore, light rays incident on the lens array unit reach the imaging element via the lens array unit and are received by at least two pixels corresponding to a respective one of the lenses. Thereby, imaging data including information on the traveling directions of the light can be obtained. In this imaging device, each of the pixels of the imaging element has the rectangular shape, and a respective one of the lenses is assigned to at least two pixels arranged along the shorter-side direction of this rectangular pixel. This feature allows the imaging element to obtain, as the imaging data, at least two viewpoint image data including light ray data whose traveling directions are different from each other in one direction along the shorter-side direction.

In an imaging device according to an embodiment, each of the pixels of the imaging element is formed into the rectangular shape, and a respective one of the lenses is assigned to at least two pixels arranged along the shorter-side direction of the rectangular shape. Therefore, in one direction along the shorter-side direction, the same number of viewpoint image data as the number of lens-assignment pixels can be obtained. That is, the waste of the pixels of the lens-assignment pixels can be eliminated and the number of lens-assignment pixels can be set to the necessary minimum number. In the case of generating viewpoint images based on the imaging data, the two-dimensional resolution of the viewpoint images is equal to the value obtained by dividing the total number of pixels in the imaging element by the number of lens-assignment pixels. Thus, the two-dimensional resolution of each of multi-viewpoint images can be enhanced in the case of generating the multi-viewpoint images in only one direction based on imaging data that is so acquired as to include information on the traveling directions of the light.

Additional features and advantages are described herein, and will be apparent from the following Detailed Description and the figures.

BRIEF DESCRIPTION OF THE FIGURES

FIGS. 5A and 5B are schematic diagrams for explaining the procedure of viewpoint image generation processing according to a comparative example;

DETAILED DESCRIPTION

The present application will be described in detail below with reference to the drawings according to an embodiment. The description will be made in the following order.

1. Embodiment (example in which the number of lens-assignment pixels is 2 and the planar shape of the pixel is a rectangular shape whose ratio of shorter-side length to longer-side length is 1 to 2)
2. Application Example (example of 3D display device employing right and left viewpoint images)
3. Modification Example (example in which the number of lens-assignment pixels is 3 and the planar shape of the pixel is a rectangular shape whose ratio of shorter-side length to longer-side length is 1 to 3)

EMBODIMENT (Entire Configuration of Imaging Device 1)

Figure 1:
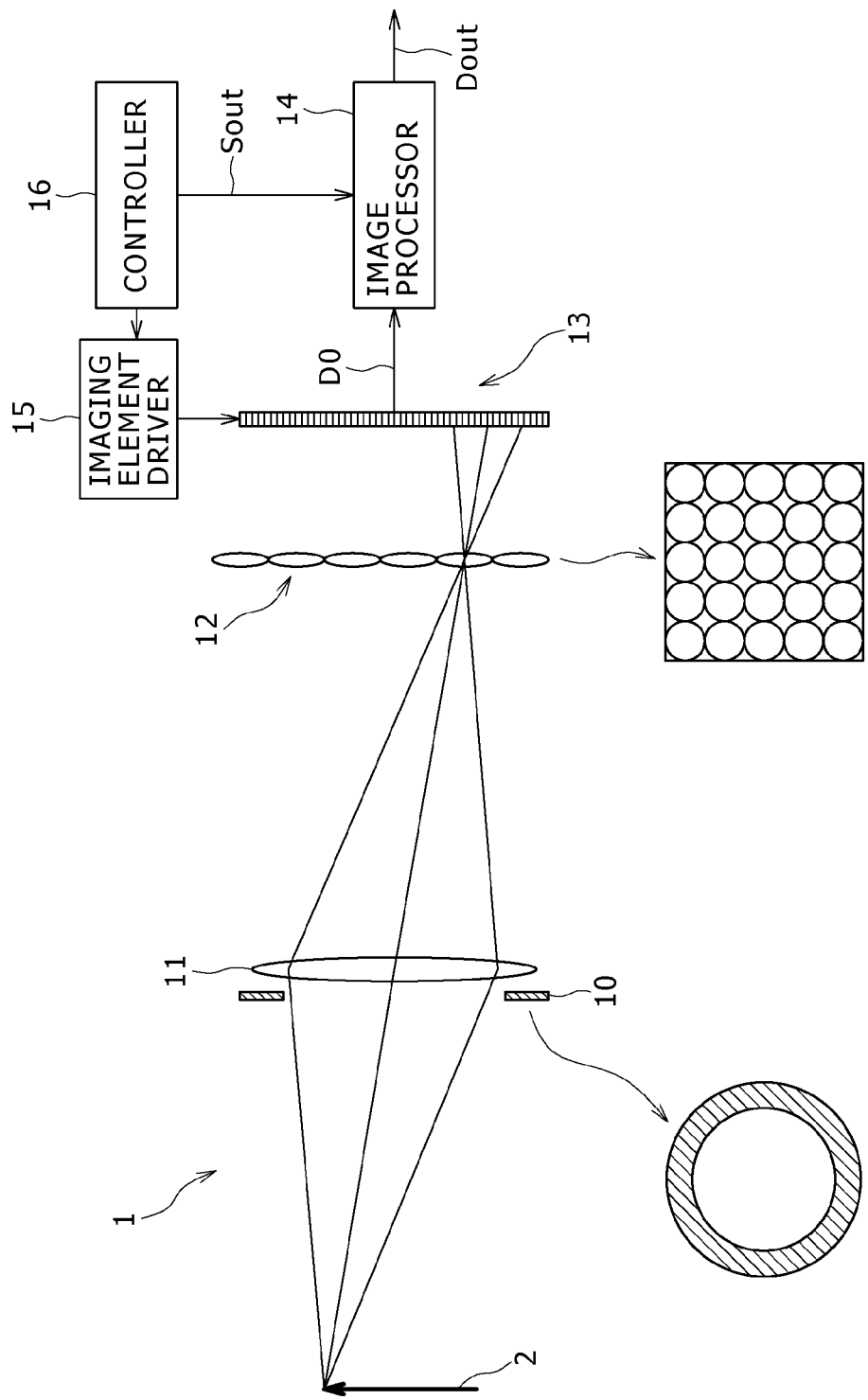
FIG. 1 is a diagram showing the entire configuration of an imaging device according to one embodiment.

FIG. 1 is a diagram showing the entire configuration of an imaging device (imaging device 1) according to one embodiment. The imaging device 1 performs imaging for an object 2 and executes image processing to thereby output image data Dout as multi-viewpoint images (in the present embodiment, right and left two viewpoint images). This imaging device 1 includes an aperture stop 10, an imaging lens 11, a microlens array 12 (lens array unit), an imaging element 13, an image processor 14, an imaging element driver 15, and a controller 16.

The aperture stop 10 is an optical aperture stop for the imaging lens 11, and a circular opening is provided at the center part of the aperture stop 10. All of light rays passing through this aperture stop 10 are received by the imaging element 13 in such a state that information on the traveling directions of the respective light rays is held.

The imaging lens 11 is the main lens for the imaging of the object and is formed of, e.g., a general imaging lens used in a video camcorder, a still camera, and so on.

The microlens array 12 is obtained by arranging plural microlenses in a matrix and is disposed on the focal plane (image forming plane) of the imaging lens 11. Each of the microlenses has e.g. a circular shape as its planar shape and is formed of e.g. a solid-state lens, a liquid crystal lens, or a diffractive lens. Two or more pixels in the imaging element 13 are assigned to a respective one of the microlenses of this microlens array 12 (details thereof will be described later).

The imaging element 13 receives the light rays from the microlens array 12 to acquire imaging data D0, and is disposed on the focal plane (image forming plane) of the microlens array 12. This imaging element 13 is a solid-state imaging element based on e.g. a charge coupled device (CCD) or a complementary metal-oxide semiconductor (CMOS).

On the light receiving plane of the imaging element 13, M×N (M, N: integer) pixels are arranged in a matrix. One microlens is assigned to two or more pixels among these pixels. Because the number of lens-assignment pixels (defined as m×n) relates to the resolution (the number of viewpoints) of multi-viewpoint images, the resolution of multi-viewpoint images becomes higher as the values of these m and n become larger. On the other hand, because (M/m) and (N/n) relate to the number of pixels (resolution) of each viewpoint image, the number of pixels of each viewpoint image becomes larger as the values of these (M/m) and (N/n) become larger. Therefore, the resolution of multi-viewpoint images and the number of pixels of each viewpoint image are in a trade-off relationship.

(Pixel Configuration of Imaging Element 13)

Figure 2:
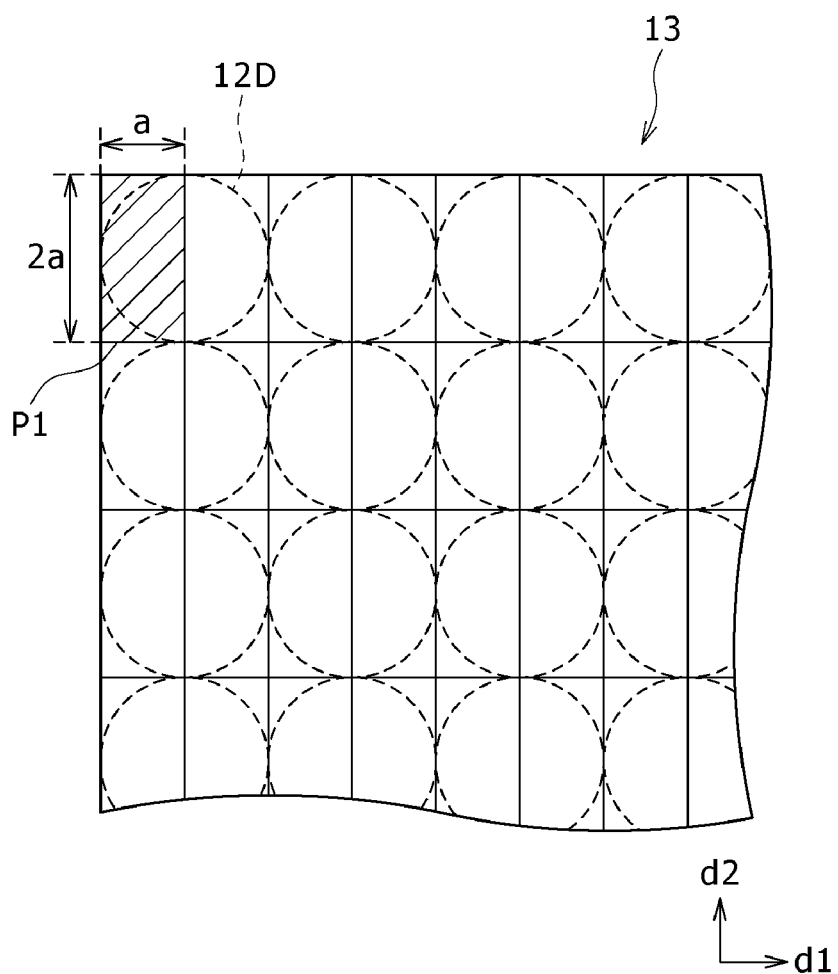
FIG. 2 is a schematic diagram showing the pixel configuration of an imaging element shown in FIG. 1.
Figure 3A:
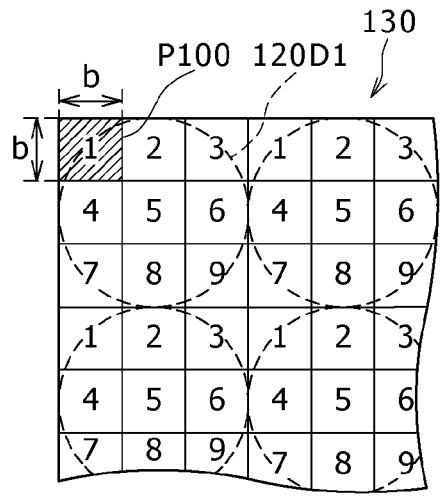
FIGS. 3A to 3C are diagrams for explaining the pixel size in the imaging element shown in FIG. 1.
Figure 3B:
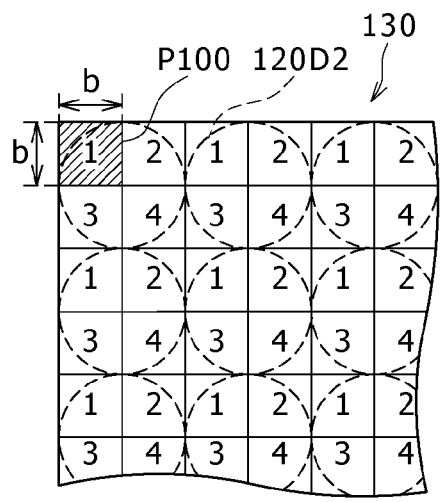
Figure 3C:
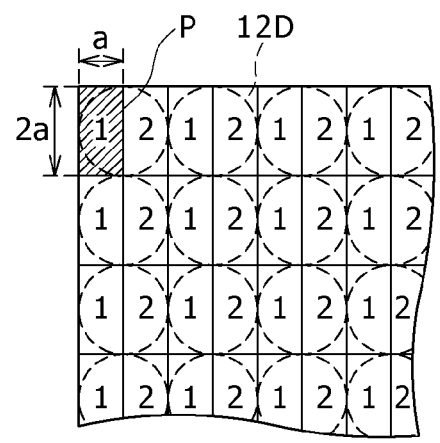

The pixel configuration of the imaging element 13 will be described below with reference to FIG. 2 and FIGS. 3A to 3C. FIG. 2 is a schematic diagram showing the pixel configuration of the imaging element 13. FIGS. 3A to 3C are diagrams for explaining the pixel size in the imaging element 13.

In the imaging element 13, the planar shape of each of plural pixels P1 arranged in a matrix is a rectangular shape. In the present embodiment, the shorter-side direction d1 (the direction along the shorter side) of this rectangular shape is equivalent to the lateral direction (horizontal direction). If the length of the shorter side of the rectangular shape is defined as a, the length of the longer side is 2a. That is, the rectangular shape has such a dimensional ratio that the ratio of shorter-side length to longer-side length is 1 to 2.

Each of the microlenses in the microlens array 12 has a circular shape as its planar shape, and the dimensional ratio of lateral diameter to longitudinal diameter is 1 to 1. Two pixels are assigned to each microlens in the shorter-side direction d1, and one pixel is assigned to each microlens in a longer-side direction d2 (longitudinal direction, vertical direction). That is, in the present embodiment, one microlens is assigned to two pixels P1 arranged along the shorter-side direction d1. An area 12D indicated by the dotted line in FIG. 2 is the area corresponding to the microlens.

The pixel area of such a pixel P1 is the same as that of a pixel P100 whose planar shape is a square (the length of one side: b), shown in FIGS. 3A and 3B, for example ($b^2=2a^2$). Thus, as shown in FIG. 3C, the diameter of the microlens in the present embodiment is smaller than that when the number of lens-assignment pixels is set to 3×3 (FIG. 3A) and that when the number of lens-assignment pixels is set to 2×2 (FIG. 3B) (the diameter of the area 12D<the diameters of an area 120D1 and an area 120D2). The description of the present embodiment will be made by taking, as an example of the pixel P1, a pixel having the same area as that of the pixel P100 for easy comparison of the two-dimensional resolution (to be described later) between the pixels P1 and P100. However, it should be obvious that the size of the pixel P1 is not designed depending on e.g. the size of an existing CCD.

The image processor 14 executes predetermined image processing including viewpoint image generation processing for the imaging data D0 obtained by the imaging element 13 and outputs the image data Dout.

The imaging element driver 15 drives the imaging element 13 and controls the light reception operation of the imaging element 13.

The controller 16 controls the operation of the image processor 14 and the imaging element driver 15 and is formed of e.g. a microcomputer.

(Operation and Effects of Imaging Device 1)

Figure 4:
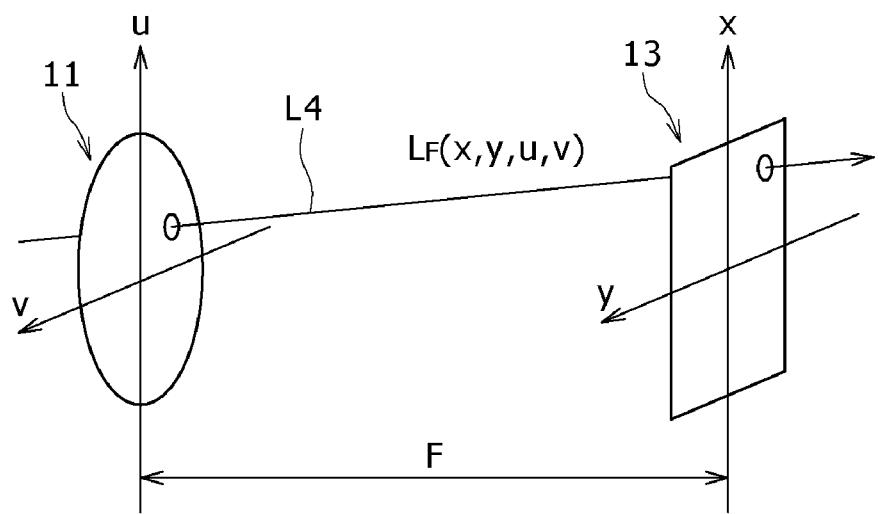
FIG. 4 is a schematic diagram for explaining information on a light ray incident on the imaging element.
Figure 6A:
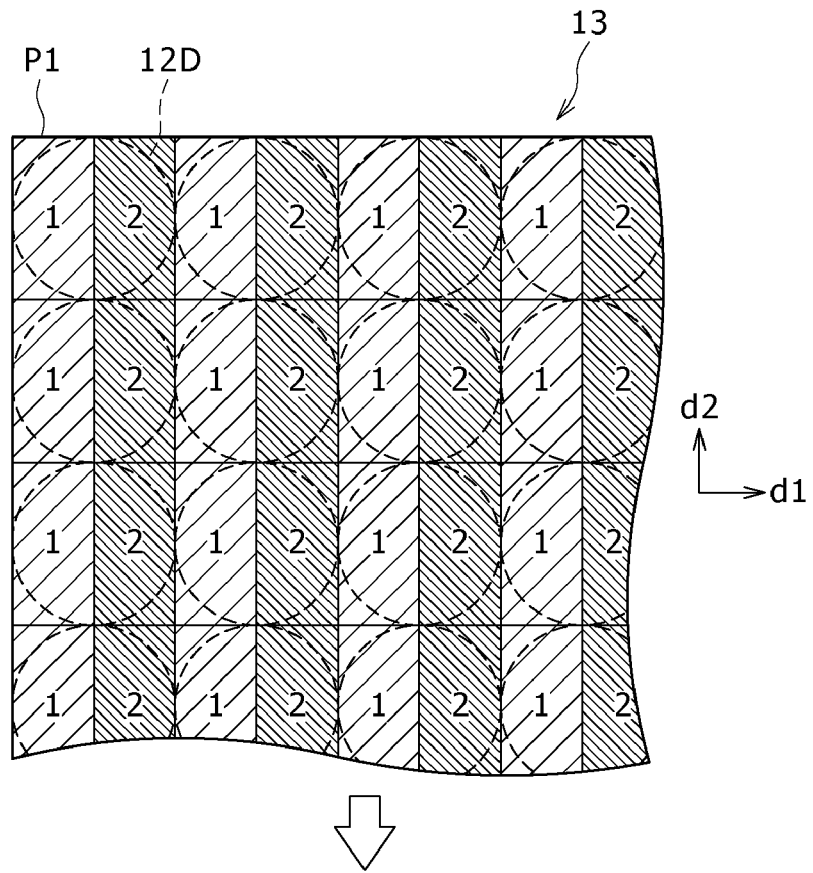
FIGS. 6A and 6B are schematic diagrams for explaining the procedure of viewpoint image generation processing in the imaging device shown in FIG. 1.
Figure 6B:
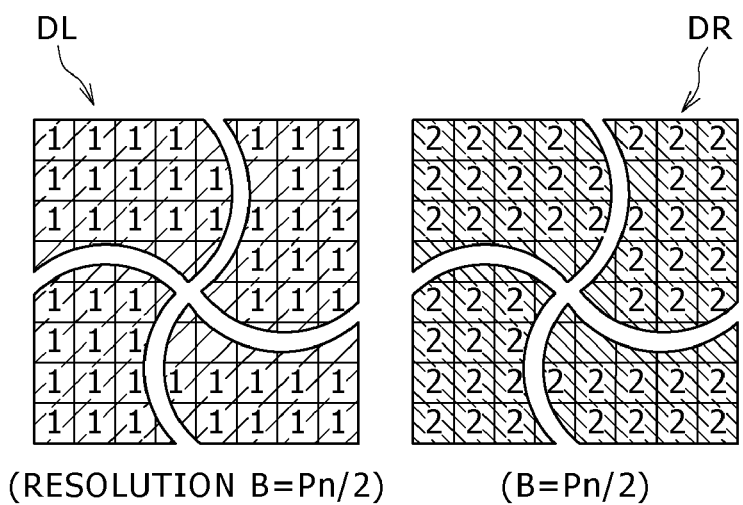

The operation and effects of the imaging device 1 of the present embodiment will be described below with reference to FIGS. 1, 6A, and 6B. FIG. 4 is a schematic diagram for explaining light ray data included in the imaging data D0.

In the imaging device 1, the image of the object 2 by the imaging lens 11 is formed on the microlens array 12 depending on the shape (circular shape) of each microlens. The light rays incident on the microlens array 12 reach the imaging element 13 via the microlens array 12 and are received by the light receiving area, onto which the opening shape (circular shape) of the aperture stop 10 is projected. At this time, the light rays incident on the microlens array 12 are received at different positions on the imaging element 13 depending on the incidence directions thereof. Specifically, the incidence direction of the light ray is determined depending on the position of the pixel P1 among the lens-assignment pixels. Furthermore, the imaging data D0 is obtained from the imaging element 13 in accordance with the driving operation by the imaging element driver 15, and this imaging data DO is input to the image processor 14.

A description will be made below about the light ray received by the imaging element 13 with reference to FIG. 4. For the description, as shown in FIG. 4, an orthogonal coordinate system (u, v) is assumed on the imaging lens plane of the imaging lens 11 and an orthogonal coordinate system (x, y) is assumed on the imaging plane of the imaging element 13. If the distance between the imaging lens plane of the imaging lens 11 and the imaging plane of the imaging element 13 is defined as F, a light ray L1 passing through the imaging lens 11 and the imaging element 13, like that shown in the diagram, is represented by a four-dimensional function $L_F(x, y, u, v)$. That is, the light ray is recorded in the imaging element 13 in such a state that the traveling direction of the light ray in addition to the position information of the light ray is held. Thus, the imaging data D0 acquired by the imaging element 13 includes not only the intensity of the light ray but also information on the traveling direction thereof.

When the above-described imaging data D0 is input to the image processor 14, the image processor 14 executes the predetermined image processing including the viewpoint image generation processing (rearrangement processing) for the imaging data D0. The imaging data resulting from the image processing is output as the image data (viewpoint image data) Dout of the imaging device 1. Details of this viewpoint image generation processing will be described below.

Initially, with reference to FIGS. 5A and 5B, the viewpoint image generation processing in an imaging device according to a comparative example will be described below. FIGS. 5A and 5B are schematic diagrams for explaining the viewpoint image generation processing by use of an imaging element 130 according to the comparative example. The imaging device of this comparative example has the same configuration as that of the embodiment except for the configuration of the imaging element 130 and the lens diameter in the microlens array. The imaging element 130 according to the comparative example is obtained by arranging plural pixels P100 whose planar shapes are each a square in a matrix, and a respective one of the microlenses is assigned to 3×3=9 pixels P100 among these plural pixels P100. In the imaging element 130, the light rays from the object 2 are received by each of areas 120D1 corresponding to the microlenses. Incidentally, 3×3 pixels P100 are given numerals of "1" to "9" for convenience.

In the case of generating multi-viewpoint images based on the imaging data acquired by such an imaging element 130, the pixel data of the pixels P100 disposed at the same position among the areas 120D1 are each extracted, and these pixel data are synthesized with each other. Specifically, if it is intended to acquire right and left two viewpoint images, the pixel data of the pixels P100 arranged on lines A are read out. Thereafter, a left viewpoint image DL100 is generated by arranging only the pixel data of the pixels corresponding to the position of "4," and a right viewpoint image DR100 is generated by arranging only the pixel data of the pixels corresponding to the position of "6. " At this time, if the total number of pixels of the imaging element 130 is defined as Pn, the two-dimensional resolution (resolution B100) of each of the left viewpoint image DL100 and the right viewpoint image DR100 is equal to the value obtained by dividing Pn by the number of lens-assignment pixels, i.e. 3×3 (=9), (B100=Pn/9).

Next, with reference to FIGS. 6A and 6B, the viewpoint image generation processing according to the present embodiment will be described below. FIGS. 6A and 6B are schematic diagrams for explaining the viewpoint image generation processing by use of the imaging element 13 according to the present embodiment. In the imaging element 13, plural pixels P1 whose planar shapes are each a rectangular shape are arranged in a matrix as described above, and a respective one of the microlenses is assigned to two pixels P1 arranged along the shorter-side direction d1 (2×1 pixels P1) among these plural pixels P1. In the imaging element 13, the light rays from the object 2 are received by each of the areas 12D corresponding to the microlenses. 2×1 pixels P1 are given numerals of "1" and "2" for convenience.

Based on the imaging data D0 acquired by such an imaging element 13, the image processor 14 extracts each of the pixel data of the pixels P1 disposed at the same position among the areas 12D and synthesizes these pixel data with each other. Specifically, if it is intended to acquire right and left two viewpoint images, the pixel data of the respective pixels P1 are read out. Subsequently, a left viewpoint image DL is generated by arranging only the pixel data of the pixels corresponding to the position of "1," and a right viewpoint image DR is generated by arranging only the pixel data of the pixels corresponding to the position of "2." At this time, if the total number of pixels of the imaging element 13 is defined as Pn, the two-dimensional resolution (resolution B) of the left viewpoint image DL and the right viewpoint image DR is equal to the value obtained by dividing Pn by the number of lens-assignment pixels, i.e. 2×1 (=2), (B=Pn/2).

As described above, in the case of generating right and left two viewpoint images in the horizontal direction, in the comparative example, the pixels other than those disposed at the positions of "4" and "6" among the lens-assignment pixels (3×3) are substantially unnecessary. In contrast, in the present embodiment, all of the pixels P1 disposed at the positions of "1" and "2" as the lens-assignment pixels (2×1) are used. That is, in the present embodiment, the number of lens-assignment pixels is equal to the number of viewpoint images to be generated, and all of the pixels P1 in the imaging element 13 are effectively utilized without waste.

As described above, in the imaging device 1 of the present embodiment, a rectangular shape is employed as the planar shape of each of the pixels P1 of the imaging element 13, and a respective one of the microlenses is assigned to two pixels P1 arranged along the shorter-side direction d1 of the rectangular shape. Thus, in one direction along the shorter-side direction d1 (in the embodiment, the horizontal direction), the same number of viewpoint images as the number of lens-assignment pixels (the left viewpoint image DL and the right viewpoint image DR) can be obtained.

Because the resolution B of each of the left viewpoint image DL and the right viewpoint image DR is equal to the value obtained by dividing the total number Pn of pixels of the imaging element 13 by the number of lens-assignment pixels, it is preferable that the number of lens-assignment pixels be as small as possible in order to achieve higher resolution. Therefore, in general, with use of the imaging element 130 obtained by arranging the pixels P100 each having a square shape like that in the above-described comparative example, the number of lens-assignment pixels is set to a comparatively-small number such as 3×3 (or 2×2). However, even with such a configuration, half or more of the lens-assignment pixels are useless if it is intended to acquire multi-viewpoint images in only one direction, such as right and left two viewpoint images. That is, although the pixels other than those on one line among the lens-assignment pixels are substantially unnecessary, the two-dimensional resolution of the viewpoint images finally obtained is decreased due to the existence of these unnecessary pixels (resolution B100=Pn/9).

In contrast, in the present embodiment, the waste of the pixels of the lens-assignment pixels can be eliminated and the number of lens-assignment pixels can be set to the necessary minimum number (2, in the case of obtaining the left viewpoint image DL and the right viewpoint image DR). Consequently, the resolution is increased compared with the above-described comparative example (resolution B=Pn/2). Thus, the two-dimensional resolution of each of multi-viewpoint images can be enhanced in the case of generating the multi-viewpoint images in only one direction based on the imaging data D0 that is so acquired as to include information on the traveling directions of the light.

Because the number of lens-assignment pixels can be set to the necessary minimum number, it is also possible to reduce the total number of pixels in the imaging element 13 as long as the desired resolution is ensured. This is advantageous in size reduction and cost reduction of the imaging element. Furthermore, due to such reduction in the number of pixels, the amount itself of information (pixel data) to be read out becomes smaller, which leads to increase in the speed of the readout. In addition, the reduction in the number of pixels also makes it possible to increase the size of one pixel. This provides e.g. an advantage that the exposure time can be shortened and thus robustness against noise can be enhanced.

APPLICATION EXAMPLE

Figure 7A:
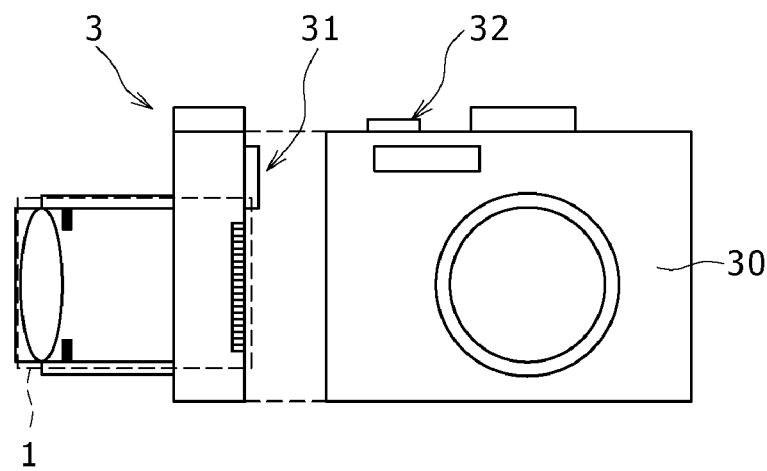
FIGS. 7A to 7C are diagrams showing one application example of the imaging device shown in FIG. 1.
Figure 7B:
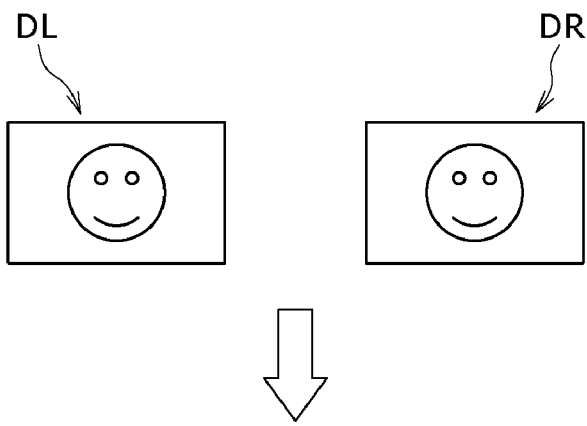
Figure 7C:
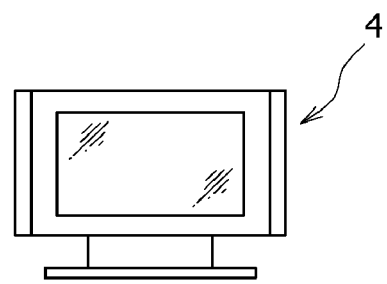

The above-described imaging device 1 is incorporated in a camera 3 shown in FIG. 7A for use therein for example. The camera 3 includes the imaging device 1 inside a case 30 and has a mechanism such as a finder 31 and a shutter button 32. Furthermore, the left viewpoint image DL and the right viewpoint image DR (FIG. 7B) as images photographed by this camera 3 are displayed by using a 3D display device 4 for three-dimensional displaying, shown in FIG. 7C for example. The 3D display device 4 is a display device that displays each of the image for the left eye and the image for the right eye based on the two-eye stereo system. Stereovision can be realized through separate observation of the right viewpoint image DR and the left viewpoint image DL displayed on such a 3D display device 4 by the right eye and the left eye, respectively.

MODIFICATION EXAMPLE

Figure 8A:
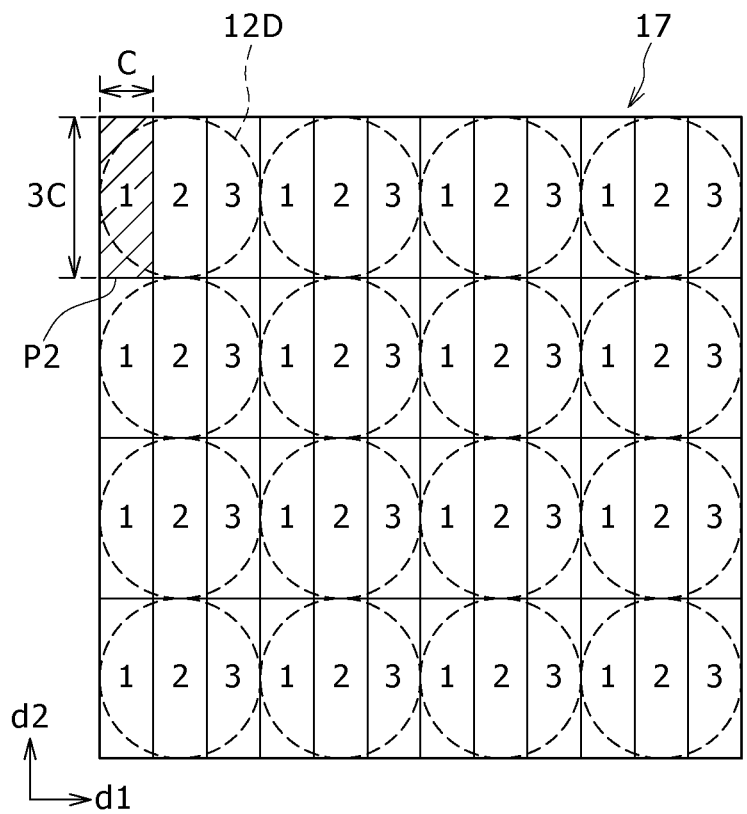
FIGS. 8A and 8B are schematic diagrams showing the pixel configuration of an imaging element according to a modification example.
Figure 8B:
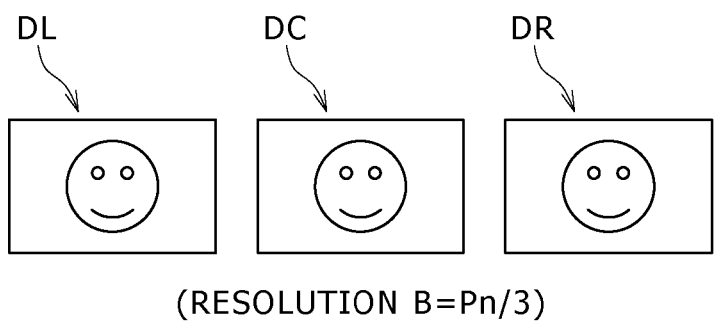

FIGS. 8A and 8B are schematic diagrams showing the pixel configuration of an imaging element (imaging element 17) in an imaging device according to a modification example of the above-described embodiment. The imaging device of the present modification example aims to acquire three viewpoint images in the horizontal direction, and has the same configuration as that of the imaging device 1 of the above-described embodiment except for the configuration of the imaging element 17. In the following description, the same components as those in the above-described embodiment are given the same numerals and symbols, and the description thereof is accordingly omitted.

Similarly to the imaging element 13 according to the above-described embodiment, the imaging element 17 receives the light rays from the microlens array 12 and acquires the imaging data D0, and plural pixels P2 are arranged in a matrix on the light receiving plane of the imaging element 17. The planar shape of each pixel P2 is a rectangular shape, and a respective one of the microlenses is assigned to two or more pixels P2 arranged along the shorter-side direction d1.

In the present modification example, the number of lens-assignment pixels is 3×1 (3). If the length of the shorter side of the rectangular shape of each pixel P2 is defined as c, the length of the longer side is 3c. That is, the rectangular shape has such a dimensional ratio that the ratio of shorter-side length to longer-side length is 1 to 3. The pixel area of each pixel P2 is the same as that of the pixel P100 shown in FIGS. 3A and 3B for example ($b^2=3c^2$). Thus, the diameter of the microlens in the present modification example is smaller than that when the number of lens-assignment pixels is set to 3×3 (FIG. 3A) and that when the number of lens-assignment pixels is set to 2×2 (FIG. 3B) (the diameter of the area 12D<the diameters of the area 120D1 and the area 120D2). Although a pixel having the same area as that of the pixel P100 is employed as an example of the pixel P2 also in the present modification example, it should be obvious that the size of the pixel P2 is not designed depending on e.g. the size of an existing CCD.

In the imaging device according to such a modification example, the light rays from the object 2 are received via the microlens array 12 by each of the areas 12D on the imaging element 17, so that the imaging data D0 is obtained, similarly to the above-described embodiment. Based on this imaging data D0, the image processor 14 executes the viewpoint image generation processing and outputs the image data Dout as viewpoint image data.

In the present modification example, based on the imaging data D0 acquired by the imaging element 17, the image processor 14 extracts each of the pixel data of the pixels P2 disposed at the same position among the areas 12D and synthesizes these pixel data with each other. Specifically, the pixel data of the respective pixels P2 are read out for the purpose of acquiring three viewpoint images whose viewpoints are different from each other in the horizontal direction. Thereafter, a left viewpoint image DL is generated by arranging the pixel data of the pixels corresponding to the position of "1." Furthermore, a center viewpoint image DC is generated by arranging the pixel data of the pixels corresponding to the position of "2," and a right viewpoint image DR is generated by arranging the pixel data of the pixels corresponding to the position of "3." At this time, if the total number of pixels of the imaging element 17 is defined as Pn, the two-dimensional resolution (resolution B) of each of the left viewpoint image DL, the center viewpoint image DC, and the right viewpoint image DR is equal to the value obtained by dividing Pn by the number of lens-assignment pixels, i.e. 3×1 (=3), (B=Pn/3).

In the case of generating three viewpoint images in the horizontal direction, in the above-described comparative example, the respective viewpoint images are generated by using e.g. the pixels disposed at the positions of "4," "5," and "6" among the lens-assignment pixels (3×3). That is, the pixels other than these three pixels are substantially unnecessary. In contrast, in the present modification example, all of the pixels P2 disposed at the positions of "1" to "3" as the lens-assignment pixels (3×1) are used. That is, in the present modification example, the number of lens-assignment pixels is equal to the number of viewpoint images to be generated, and all of the pixels P2 in the imaging element 17 are effectively utilized without waste.

As described above, in the present modification example, a rectangular shape is employed as the planar shape of each of the pixels P2 of the imaging element 17, and a respective one of the microlenses is assigned to three pixels P2 arranged along the shorter-side direction d1 of the rectangular shape. Thus, in one direction along the shorter-side direction d1 (in the modification example, the horizontal direction), the same number of viewpoint images as the number of lens-assignment pixels (the left viewpoint image DL, the center viewpoint image DC, and the right viewpoint image DR) can be obtained. Therefore, the waste of the pixels of the lens-assignment pixels can be eliminated and the number of lens-assignment pixels can be set to the necessary minimum number (3, in the modification example). Consequently, the resolution is increased compared with the above-described comparative example (resolution B=Pn/3). Thus, the same advantages as those by the above-described embodiment can be achieved.

Furthermore, stereoscopic displaying can be realized by displaying these three viewpoint images, i.e. the left viewpoint image DL, the center viewpoint image DC, and the right viewpoint image DR, by using a 3D display device of e.g. the multi-eye stereo system. As the multi-eye stereo system, e.g. the following lenticular system can be used. Specifically, in the lenticular system, a special plate (lenticular plate) having a convex and concave shape on its surface is applied onto a display panel for displaying plural synthesized parallax images, and thereby the displayed images are observed through the lenticular plate. The lenticular plate is obtained by arranging, on a plate, e.g. a large number of cylindrical lenses (hog-backed lenses) extending along the longitudinal direction in the lateral direction. In the mechanism of the lenticular system, by utilizing the optical refraction of the lenses, the right eye sees the image for the right eye, minutely cut into a longitudinal line manner, and the left eye also sees the image for the left eye similarly. Using the lenticular plate allows the right and left eyes of the viewer to simultaneously see images different from each other comparatively easily. Through the synthesis of these images in the brain, the images are recognized as a stereoscopic image for the viewer.

Although the embodiment and the modification example thereof have been described above, the present application is not limited to the above-described embodiment and so on but various modifications can be incorporated therein. For example, the above embodiment and so on has been described by taking as an example the case in which the number of lens-assignment pixels is 2 or 3. However, the number of lens-assignment pixels may be equal to or larger than 4. When the number of lens-assignment pixels is set to n (n is an integer equal to or larger than 2), n pixels are arranged along the shorter-side direction of the rectangular shape, and the shape of each pixel is set to the rectangular shape having such a dimensional ratio that the ratio of shorter-side length to longer-side length is 1 to n. This makes it possible to obtain n viewpoint images whose viewpoints are different from each other in one direction.

Furthermore, the above embodiment and so on has been described by taking as an example the case in which the shorter-side direction d1 and the longer-side direction d2 are the lateral direction (horizontal direction) and the longitudinal direction (vertical direction), respectively, and multi-viewpoint images varying in the horizontal direction, such as right and left viewpoint images, are generated. However, the correspondence relationship between these directions is not limited thereto. For example, it is also possible that the shorter-side direction d1 is the longitudinal direction (vertical direction) and the longer-side direction d2 is the lateral direction (horizontal direction). That is, the pixel configuration obtained by rotating the above-described imaging element by 90° may be employed. This also makes it possible to generate multi-viewpoint images whose viewpoints are different from each other in the vertical direction, such as upper and lower viewpoint images.

Moreover, the above embodiment and so on has been described by taking the microlens array obtained by two-dimensionally arranging plural microlenses as an example of the lens array unit of the present invention. However, the lens array unit is not limited thereto but may be a lens array (lenticular lens) obtained by one-dimensionally arranging plural lenses. As the lenticular lens, a unit obtained by arranging e.g. plural hog-backed lenses extending along the vertical direction in the horizontal direction can be used similarly to the above-described lenticular plate. If the lenticular lens is used, pixels on n columns on the imaging element are assigned to one lens. When such a lenticular lens is used, the optical power is absent in the vertical direction. However, there is no problem because the present invention aims to acquire multi-viewpoint images in only the horizontal direction. On the other hand, if it is desired to obtain multi-viewpoint images in only the vertical direction, the above-described imaging element and the lenticular lens are rotated by 90°, and pixels on n rows are assigned to one lens.

In addition, the above embodiment and so on has been described by taking, as an application example of the imaging device according to the embodiment of the present invention, stereoscopic displaying based on the two-eye stereo system with use of right and left two viewpoint images and stereoscopic displaying based on the multi-eye stereo system with use of three viewpoint images in the horizontal direction. However, the imaging device according to the embodiment of the present invention can be applied also to other techniques. For example, the imaging device can be applied also to a ranging technique of calculating the distance to the measurement object by using right and left two viewpoint images in the horizontal direction. In this case, the phase difference between right and left two viewpoint images is obtained by using e.g. stereo matching processing, and a depth map is created from this phase difference.

Furthermore, in the above-described embodiment, the image processor 14 is treated as one of the components included in the imaging device 1. However, this image processor 14 does not necessarily need to be provided inside the imaging device 1. For example, the imaging device 1 may have the following configuration. Specifically, the image processor 14 is provided in another device such as a personal computer (PC), and imaging data obtained by the imaging optical system is transferred to the PC to execute image processing in the PC.

Moreover, the imaging data acquired by using rectangular pixels as above is almost equivalent to that obtained by integrating the output from square pixels in the horizontal direction or the vertical direction. However, in the embodiment of the present invention, the planar shape of the pixel is a rectangular shape, and thus the number of readout lines is smaller compared with the case in which the planar shape of the pixel is a square. In addition, the integration processing is unnecessary, and therefore correspondingly the speed of the processing can be increased.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An imaging device, comprising:
    an imaging lens configured to have an aperture stop;
    an imaging element configured to include a plurality of pixels that each have a rectangular shape as a planar shape and are arranged in a matrix as a whole, and acquire imaging data based on received light; and
    a lens array unit configured to be disposed on an image forming plane of the imaging lens and include a plurality of lenses, a respective one of the lenses being assigned to n, n is an integer equal to or larger than 2, pixels arranged along a shorter-side direction of the pixels having the rectangular shape in the imaging element, and
    wherein in each of the plurality of pixels, length of a longer side of the pixel is n times length of a shorter side of the pixel.

2. The imaging device according to claim 1, wherein the n is 2.

3. The imaging device according to claim 1, wherein the n is 3.

4. The imaging device according to claim 1, further comprising
    an image processor configured to extract, from the imaging data, pixel data of pixels disposed at the same position among pixel areas formed on a lens-by-lens basis and synthesize the pixel data with each other to generate a plurality of viewpoint images.

* * * * *